United States Patent [19]
Kami

[11] Patent Number: 5,890,740
[45] Date of Patent: Apr. 6, 1999

[54] REAR CHASSIS SYSTEM FOR A MOTOR VEHICLE

[75] Inventor: Yozo Kami, Saitama-ken, Japan

[73] Assignee: Honda Giken Kogyo Kabushiki Kaisha, Tokyo, Japan

[21] Appl. No.: 437,956

[22] Filed: May 10, 1995

[30] Foreign Application Priority Data

May 30, 1994 [JP] Japan .................................. 6-140867

[51] Int. Cl.⁶ ....................................................... B60P 3/22
[52] U.S. Cl. ................... 280/834; 280/831; 280/124.125
[58] Field of Search .................... 280/660, 690, 280/788, 834, 831, 124.125, 830

[56] References Cited

U.S. PATENT DOCUMENTS

| | | | |
|---|---|---|---|
| 3,701,540 | 10/1972 | Pringle | 280/834 |
| 4,506,756 | 3/1985 | Bergous | 280/831 |
| 4,991,867 | 2/1991 | Washizu et al. | 280/690 |
| 5,370,418 | 12/1994 | Pugh | 280/830 |
| 5,405,167 | 4/1995 | Lee | 280/830 |
| 5,560,651 | 10/1996 | Kami et al. | 280/834 X |

FOREIGN PATENT DOCUMENTS

| | | | |
|---|---|---|---|
| 0077697 | 4/1983 | European Pat. Off. | 280/834 |
| 2649885 | 7/1917 | German Dem. Rep. | 280/831 |
| 0133291 | 5/1990 | Japan | 280/831 |
| 58643 | 1/1993 | Japan . | |
| 0794737 | 5/1958 | United Kingdom | 280/831 |

*Primary Examiner*—Christopher P. Ellis
*Attorney, Agent, or Firm*—Carrier, Blackman & Associates, P.C.; Joseph P. Carrier; William D. Blackman

[57] ABSTRACT

A pair of rear wheel suspension assemblies are attached to arm brackets provided on a fuel tank which is in turn mounted on a lower surface of a vehicle body by means of mount brackets likewise attached to the fuel tank. An inner frame is incorporated inside the fuel tank. To prevent any deformation of the fuel tank when excessive load is applied to the suspension assemblies, the mount brackets and the arm brackets are made less rigid and provided with less mechanical strength than the parts of the fuel tank at which these brackets are attached. Thus, the fuel tank in effect serves as a subframe so that the rear chassis system can better ensure sufficient mechanical strength and rigidity, and can be easily mounted on a vehicle body without sacrificing the capacity of the fuel tank and without increasing the weight of the chassis structure.

20 Claims, 7 Drawing Sheets

REAR CHASSIS SYSTEM FOR A MOTOR VEHICLE

TECHNICAL FIELD

The present invention relates to a rear chassis system for a motor vehicle provided with a fuel tank serving as a subframe for supporting rear wheel suspension assemblies.

BACKGROUND OF THE INVENTION

Conventionally is known a rear chassis system in which rear wheel suspension assemblies are mounted on the vehicle body via a subframe. (Refer to Japanese patent laid open (kokai) publication No. 5-8643.) According to this conventional system, a fuel tank is supported by the subframe which is in turn mounted on the vehicle body. Therefore, a step of mounting the fuel tank on the subframe needs to be carried out before mounting the subframe on the vehicle body, and this may increase the complexity of the assembling process.

Additionally, interference between the subframe members and the fuel tank must be avoided, and it creates some difficulty in ensuring the necessary capacity of the fuel tank, and the necessary mechanical strength and rigidity of the subframe with the result that the weight of the rear chassis and the manufacturing cost tend to be increased.

BRIEF SUMMARY OF THE INVENTION

In view of such problems of the conventional system, a primary object of the present invention is to provide a rear chassis system for a motor vehicle which combines a fuel tank and a subframe in a favorable manner.

A second object of the present invention is to provide a rear chassis system which provides a support structure for rear wheel suspension assemblies having sufficient mechanical strength and rigidity without increasing the weight and the manufacturing cost of the rear chassis system.

A third object of the present invention is to provide a rear chassis system which is easy to install.

A fourth object of the present invention is to provide a rear chassis system which can be readily modified for different specifications of the vehicle bodies and the rear wheel suspension assemblies.

According to the present invention, these and other objects can be accomplished by providing a rear chassis system for a motor vehicle, comprising: a fuel tank including an outer shell mounted on a vehicle body; and a pair of rear wheel suspension assemblies including link arms having base ends pivotably secured to pivoting portions provided on said fuel tank.

According to this structure, because the suspension arms are directly attached to the fuel tank, and the fuel tank is then mounted on the vehicle body, the fuel tank, in effect, serves as a rear subframe. Therefore, interference between the fuel tank and the rear subframe would not be a problem, and the space efficiency can be thereby improved, and the efforts required for installing the fuel tank can be reduced.

Preferably, the fuel tank comprises an inner frame which includes at least a structural member extending laterally across the fuel tank inside the fuel tank. More preferably, the inner frame comprises a plurality of lateral and longitudinal structural members combined into a ladder shaped frame. For the convenience of fabricating a fuel tank incorporated with an inner frame, the outer shell of the fuel tank may comprise upper and lower halves, the inner frame being interposed between the upper and lower halves of the outer shell. By forming the outer shell from upper and lower halves, it is possible to adapt the chassis system to different car models simply by changing the brackets and/or the upper shell without changing the major part of the fuel tank or the lower shell. In order to avoid creation of any dead space inside the fuel tank, the structural members preferably have an open cross section.

In view of the need to protect the integrity of the fuel tank even under extreme conditions, the brackets and connecting parts which connect the fuel tank to the suspension assemblies and the vehicle body should have smaller mechanical strength and rigidity than the parts of the fuel tank at which the brackets and the connecting parts are attached or provided. For instance, the mount brackets mounting the fuel tank on the vehicle body may be attached to the lower half of the outer shell by fastening means including stud bolts passed through the mount brackets and the outer shell, each of the stud bolts being provided with a large diameter portion secured to the fuel tank, and a small diameter portion secured to the mount bracket. Because the external forces from the vehicle body and the suspension assemblies acting on the fuel tank are mostly applied to the lower half of the outer shell, the interface between the upper and lower halves of the outer shell is relatively protected from stresses. Also, the inner frame should be arranged such that it may be able to effectively and securely support the mounting brackets and the arm brackets on the fuel tank.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
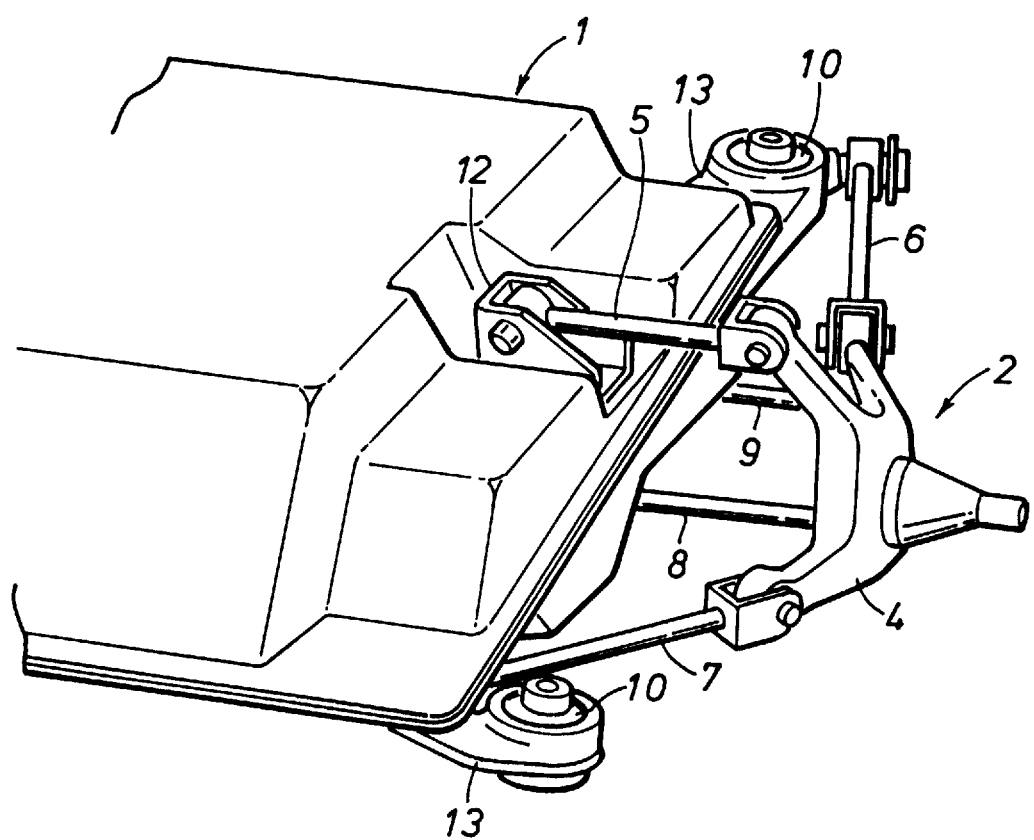
FIG. 1 is a fragmentary perspective view showing an essential part of the rear chassis system according to the present invention.
Figure 2:
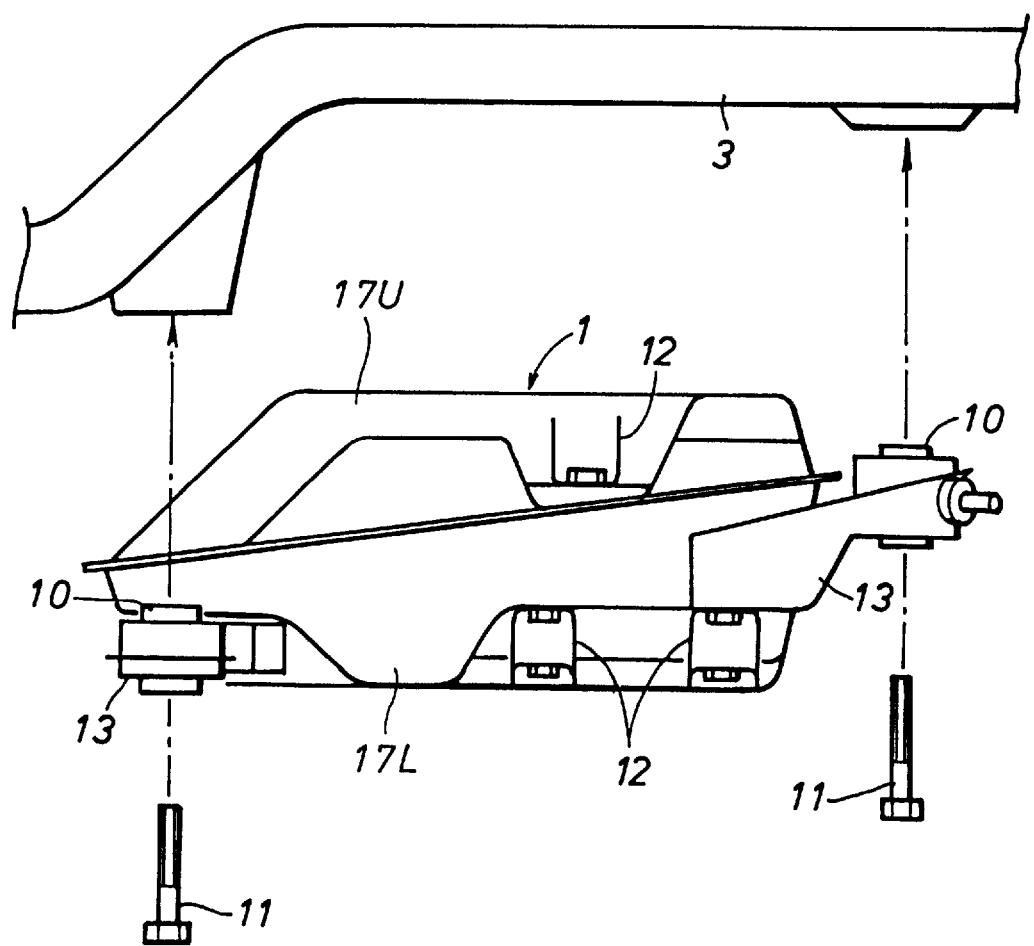
FIG. 2 is an exploded side view showing the manner in which the fuel tank is mounted on the vehicle body according to the present invention.

FIGS. 1 and 2 show an essential part of a rear chassis for a motor vehicle constructed according to the present invention. In this rear chassis system, a main portion serving as a subframe consists of a fuel tank 1, and a multi-link rear wheel suspension assembly 2 is fixedly secured to a vehicle body main frame 3 via this fuel tank 1. As one can readily understand, there are a pair of rear wheel suspension assemblies similarly attached to either side of the fuel tank 1, but only one of them is illustrated and described in this description. Inner ends of an upper arm 5, a leading arm 6, a trailing arm 7, a lower arm 8 and a control arm 9 are pivotably attached to the fuel tank 1 while outer ends of these link arms support a wheel carrier 4, and the fuel tank 1 is in turn mounted on a lower surface of the vehicle body main frame 3 by using threaded bolts 11 passed centrally through anti-vibration mount rubber blocks 10 secured to the fuel tank 1. The threaded bolts 11 are used in this embodiment for mounting the fuel tank 1 onto the vehicle body main frame 3, but the widely accepted conventional mounting method using bands can be also used.

Figure 4:
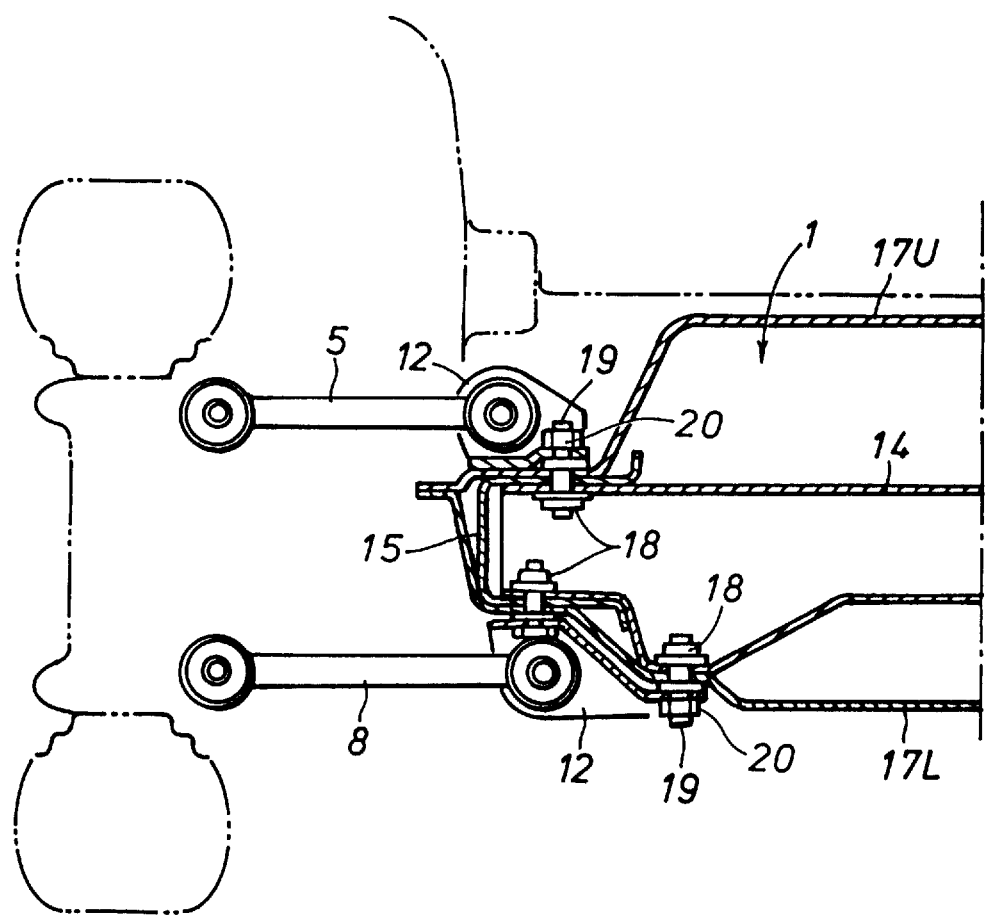
FIG. 4 is a sectional front view showing a part of the fuel tank and the link arms mounted on the fuel tank via the arm brackets according to the present invention.
Figure 5:
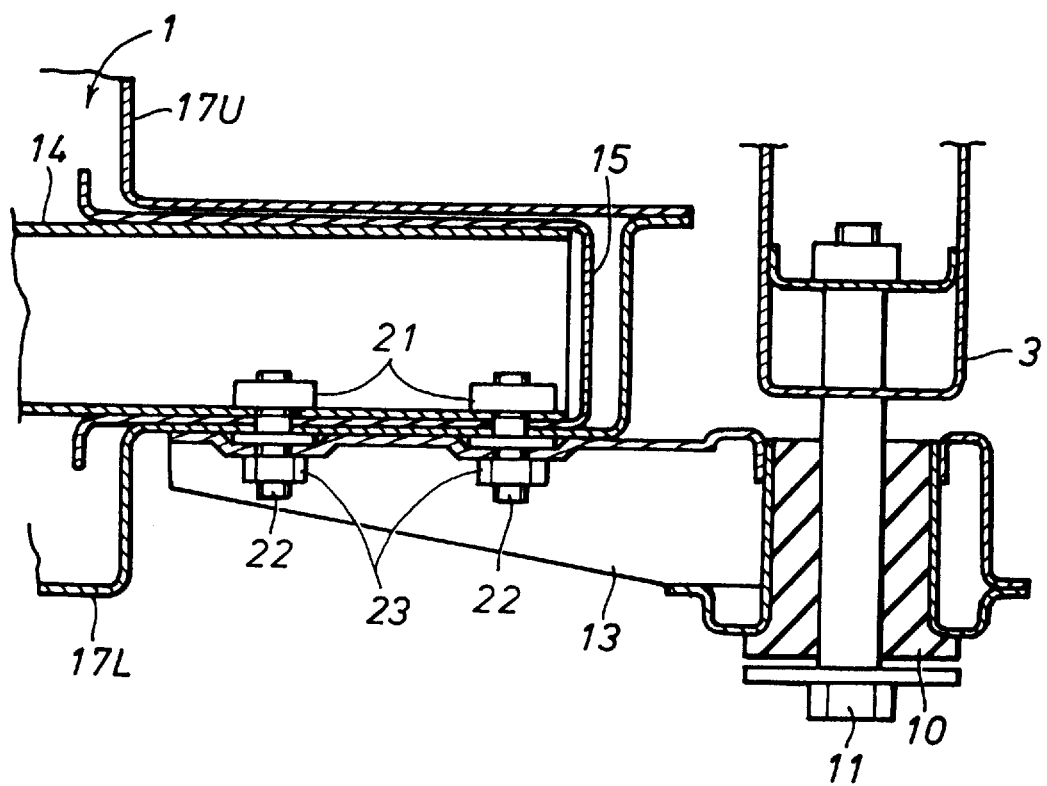
FIG. 5 is an enlarged sectional view showing the mount bracket for mounting the fuel tank on the vehicle body according to the present invention.

More specifically, each of the link arms 5 to 9 is pivotably attached to an arm bracket 12 which is in turn secured to a suitable location of the fuel tank 1 by using threaded bolts 19, and nuts 18 and 20 as shown in FIG. 4. The anti-vibration mount rubber blocks 10 are each secured to a mount bracket 13 which is likewise secured to the fuel tank 1 by using threaded bolts 22 and nuts 21 and 23 as shown in FIG. 5.

Figure 3:
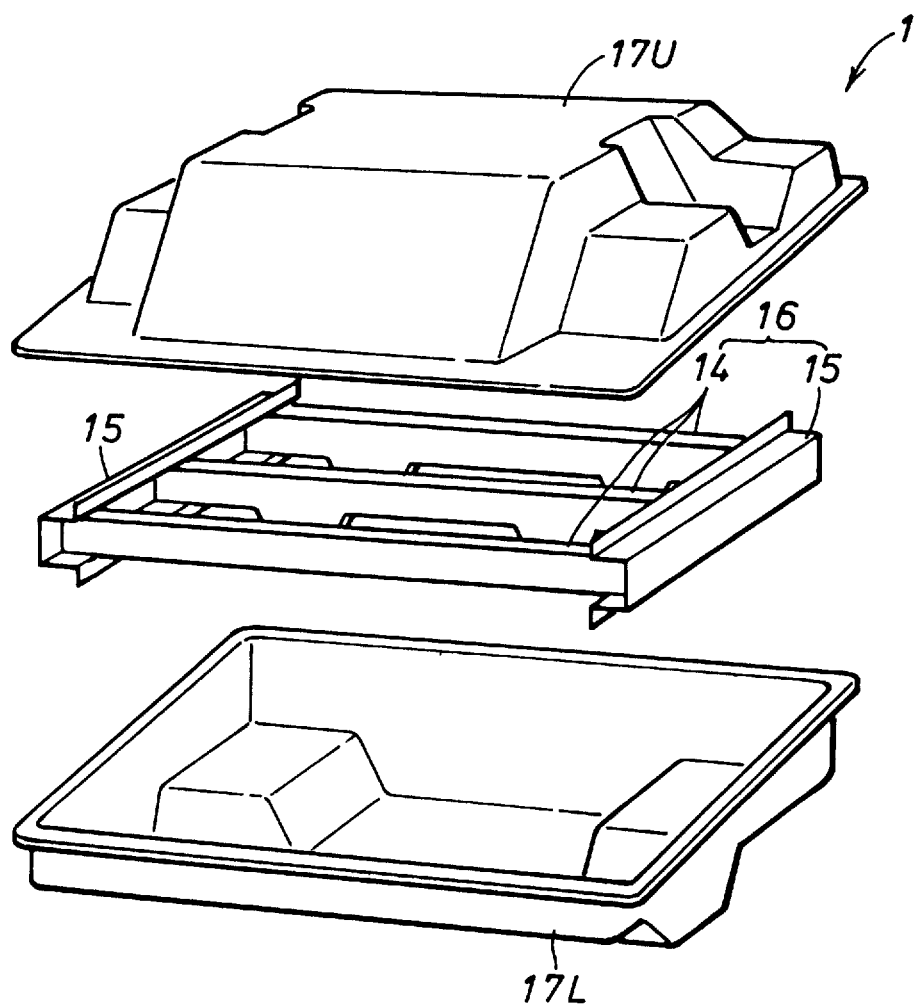
FIG. 3 is an exploded perspective view showing the structure of the fuel tank according to the present invention.

As illustrated in FIG. 3, the fuel tank 1 comprises an inner frame 16 consisting of three lateral members 14 extending laterally of the vehicle body and two longitudinal members 15 integrally joined to the end portions of the lateral members 14 in the manner of a ladder, and an outer shell 17 formed by joining upper and lower shell halves 17U and 17L in a liquid tight manner so as to define an enclosed space therein for accommodating fuel therein. The specific structure of the inner frame 16 is not limited by this embodiment, but may consist of any structure suitable for each particular application. Each of the members 14 and 15 of the inner frame 16 consists of a structural member having a C-shaped open cross section. Therefore, the structural members 14 and 15 do not define any enclosed space, and the interior of the outer shell 17 defines an enclosed space for receiving liquid fuel without creating any dead space therein.

If necessary, these members 14 and 15 may also have a closed cross section, for instance for increased mechanical strength and rigidity, instead of an open cross section as given in this embodiment. In that case, openings may be provided in each of these members to communicate the interior of the member with the exterior thereof so that no dead space may be created inside the fuel tank 1.

Figure 6:
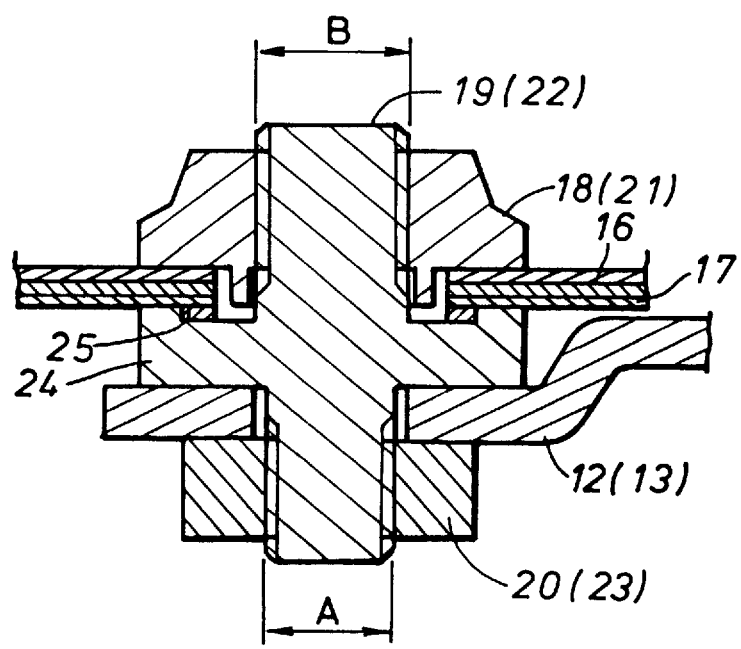
FIG. 6 is an enlarged fragmentary sectional view showing the stud bolt shown in FIG. 5.

As illustrated in FIG. 4, the arm brackets 12 supporting the inner ends of the link arms 5 to 9 are fixedly secured to portions of the fuel tank 1 where the outer shell 17 is joined to the lateral members 14 and/or the longitudinal members 15 of the inner frame 16, by using the threaded bolts 19 and nuts 18 and 20. Each of the threaded bolts 19 consists of a stud bolt 19 which is passed through the bracket 12, the outer shell 17 and the inner frame 16, and is threadably engaged by a nut 18 which is in turn welded to one of the lateral members 14 as illustrated in FIG. 6. A nut 20 is threadably engaged with the stud bolt 19 to thereby secure the bracket 12 to the fuel tank assembly.

As illustrated in FIG. 5, the mount brackets 13 are each fixedly secured to portions of the fuel tank 1 where the outer shell 17 is joined to the lateral members 14 and/or the longitudinal members 15, by using the threaded bolts 22 and nuts 21 and 23. Each of these threaded bolts consists of a stud bolt 22 passed through the mount bracket 13, the outer shell 17 of the fuel tank 1, and the inner frame 16, and is threadably engaged by a nut 21 which is in turn welded to one of the lateral members 14. A nut 23 is threadably engaged with the stud bolt 22 to thereby secure the bracket 13 to the fuel tank assembly.

The arrangements of these threaded bolts 19 and 22 and the associated nuts 18, 20, 21 and 23 are similar to each other, and are illustrated in FIG. 6. The stud bolt 19 or 22 is sealed by a gasket 25 interposed between a flange 24 provided in an intermediate part of the stud bolt 19 or 22 and the outer surface of the outer shell 17 so as to prevent any leakage of fuel from this part.

As illustrated in FIG. 2, the mount brackets 13 are attached to the lower surface of the lower half 17L of the outer shell 17. The arm brackets 12 with the exception of the arm bracket for the upper arm 5 are likewise mounted on the lower half 17L of the outer shell 17. The arm bracket for the leading arm 6 is mounted on one of the mount brackets 13. Because the brackets 12 and 13 which are likely to be subjected to substantial loads are mostly attached to the lower half 17L, and the upper half 17U of the outer shell 17 is not subjected to any substantial load, the stress acting on the part of the outer shell 17 joining the upper and lower halves 17U and 17L can be minimized. The reduction in the stress developing in the outer shell 17 contributes to the reduction in the weight of the outer shell 17. Preferably, the brackets 12 and 13 are mounted on the parts of the inner frame 16 where the lateral and longitudinal structural members 14 and 15 intersect with each other for increased mechanical strength and rigidity.

The diameter B of the part of the stud bolt 19 or 22 which is secured to the fuel tank 1 is greater than the diameter A of the part of the stud bolt 19 or 22 secured to the bracket 12 or 13. Thus, when the fastening torque applied to the stud bolt 19 or 22 for securing the bracket 12 or 13 is excessive, the threaded part of the stud bolt 19 or 22 secured to the fuel tank would not be damaged because the threaded part of the stud bolt 19 or 22 secured to the bracket would break first, and the replacement of the stud bolt 19 or 22 can be simplified. Furthermore, when a large external force is applied to the link arms 5 to 9, because the mounting structure for the brackets 12 and 13 ruptures under shear stress before the outer shell 17 deforms or is otherwise adversely affected, the fuel tank 1 would not be subjected to any excessive load. This effect can be even more enhanced by setting the mechanical strength and rigidity of the brackets and connecting parts which connect the fuel tank to the suspension assemblies and the vehicle body smaller than those of the parts of the fuel tank at which the brackets and the connecting parts are attached or provided. This is highly desirable in view of the need to protect the integrity of the fuel tank even under extreme condition.

Figure 7:
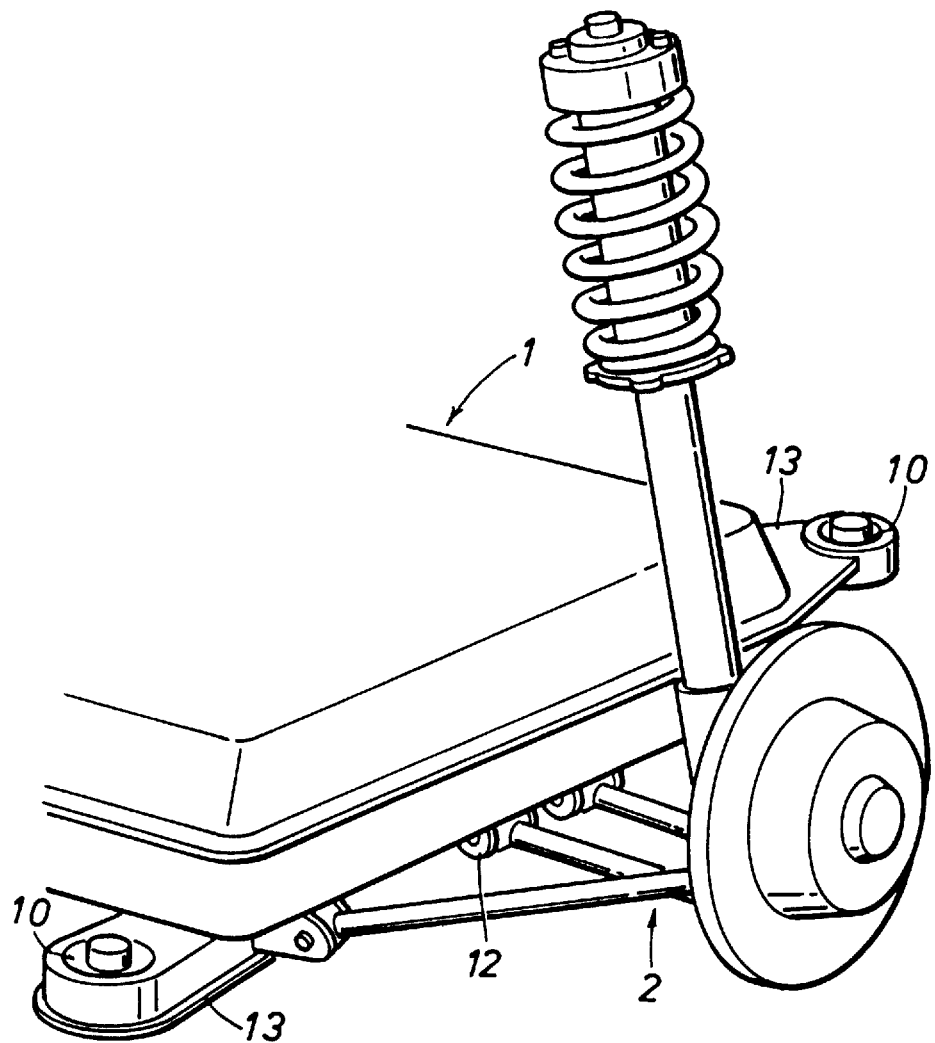
FIG. 7 is a fragmentary perspective view showing another embodiment of the present invention.

The present invention is not limited to the above described multi-link wheel suspension systems in its application but can be equally applied to other wheel suspension systems such as strut suspension systems as illustrated in FIG. 7.

Thus, according to the present invention, because the fuel tank serves as a rear subframe, the interference between the fuel tank and the rear subframe would not be a problem with the result that the space efficiency is improved and the assembly work is simplified. Therefore, it becomes possible to achieve a design which is efficient in terms of mechanical strength and rigidity, and can satisfy the requirements for both the capacity of the fuel tank and the mechanical properties such as mechanical strength and rigidity without any difficulty so that the weight of the rear chassis structure can be reduced. By using separate members for the brackets for mounting the fuel tank to the vehicle body or the brackets for pivotably supporting the link arms, it is made possible to use a common main part for fuel tanks used in association with vehicle bodies and suspension systems of different specifications, and the replacement of component parts is also facilitated. Furthermore, because some structural members are arranged inside the fuel tank, the rust prevention for these members is simplified. This advantage, combined with the possibility of significantly reducing the weight of the rear chassis system, an overall advantage can be achieved in the manufacturing and maintenance costs.

Although the present invention has been described in terms of specific embodiments, it is possible to modify and alter details thereof without departing from the spirit of the present invention. The scope of the invention is indicated by the appended claims.

What we claim is:

1. A rear chassis system for a motor vehicle, comprising:
    a fuel tank unit including an outer shell mounted on a vehicle body, and pivot support brackets integrally provided on the outer shell; and
    a pair of rear wheel suspension assemblies including link arms having base ends pivotally secured to said support brackets of said fuel tank unit so that the base ends of the link arms are directly attached to the fuel tank unit.

2. A rear chassis system for a motor vehicle according to claim 1, wherein said fuel tank unit comprises an inner frame which includes at least a structural member extending laterally across said fuel tank unit inside said outer shell.

3. A rear chassis system for a motor vehicle according to claim 2, wherein said structural member has an open cross section.

4. A rear chassis system for a motor vehicle according to claim 2, wherein said inner frame comprises a plurality of lateral and longitudinal structural members combined into a ladder shaped frame.

5. A rear chassis system for a motor vehicle according to claim 2, wherein said outer shell comprises upper and lower halves which are joined together so as to define a closed space inside said outer shell with said inner frame interposed between said upper and lower halves.

6. A rear chassis system for a motor vehicle according to claim 1, wherein said fuel tank unit is securely attached to said vehicle body using a plurality of mount brackets which are securely attached to said outer shell.

7. A rear chassis system for a motor vehicle according to claim 6, wherein said outer shell of said fuel tank unit comprises upper and lower halves, and said mount brackets are securely attached to said lower half of said outer shell.

8. A rear chassis system for a motor vehicle according to claim 7, wherein said mount brackets are attached to the said lower half of said outer shell by fastening means including stud bolts passed through said mount brackets and said outer shell, each of said stud bolts being provided with a large diameter portion secured to said fuel tank, and a small diameter portion secured to said mount bracket.

9. A rear chassis system for a motor vehicle according to claim 6, wherein an effective mechanical rigidity of each of said mount brackets is less than that of a part of said fuel tank unit at which said mount bracket is attached.

10. A rear chassis system for a motor vehicle according to claim 6, wherein an effective mechanical strength of each of said mount brackets is less than that of a part of said fuel tank unit at which said mount bracket is attached.

11. A rear chassis system for a motor vehicle according to claim 1, wherein said outer shell of said fuel tank unit comprises upper and lower halves, and at least some of said pivot support brackets are securely attached to said lower half of said outer shell.

12. A rear chassis system for a motor vehicle according to claim 11, wherein said pivot support brackets are attached to said lower half of said outer shell by fastening means including stud bolts passed through said pivot support brackets and said outer shell, each of said stud bolts being provided with a large diameter portion secured to said outer shell, and a small diameter portion secured to said pivot support brackets.

13. A rear chassis system for a motor vehicle according to claim 1, wherein an effective mechanical rigidity of each of said pivot support brackets is less than that of a part of said outer shell at which said pivot support bracket is attached.

14. A rear chassis system for a motor vehicle according to claim 1, wherein an effective mechanical strength of each of said pivot support brackets is less than that of a part of said outer shell at which said pivot support bracket is attached.

15. A rear chassis system for a motor vehicle, comprising:
    a fuel tank unit including an outer shell mounted on a vehicle body, and pivot support brackets integrally provided on the outer shell; and
    a pair of rear wheel suspension assemblies including link arms having base ends pivotally secured to said pivot support brackets of said fuel tank unit so that the base ends of the link arms are directly attached to the fuel tank unit; and
    said fuel tank unit further including means disposed therein for reinforcing said outer shell where said pivot support brackets are provided thereon.

16. A rear chassis for a motor vehicle according to claim 2, wherein said pivot support brackets are jointly connected to said outer shell and said inner frame.

17. A rear chassis for a motor vehicle, comprising:
    a fuel tank unit including a fuel tank and a plurality of mount brackets fixed to said fuel tank, and a plurality of arm brackets fixed to said fuel tank;
    said fuel tank being mounted on a vehicle through said mount brackets; and
    a pair of rear wheel suspension assemblies including link arms having base ends pivotally mounted to said arm brackets whereby said link arms are directly mounted to said fuel tank unit.

18. A rear chassis for a motor vehicle according to claim 17, wherein said fuel tank comprises an outer shell and reinforcing means disposed within and connected to said outer shell for reinforcing the strength and rigidity of the outer shell.

19. A rear chassis for a motor vehicle according to claim 17, wherein said fuel tank includes an outer shell formed of upper and lower halves, said mount brackets being fixed to said lower half of said outer shell.

20. A rear chassis motor vehicle according to claim 18, wherein said reinforcing means is connected to the outer shell in a vicinity of said pivot brackets.

* * * * *

UNITED STATES PATENT AND TRADEMARK OFFICE
CERTIFICATE OF CORRECTION

PATENT NO. : 5,890,740
DATED : 6 April 1999
INVENTOR(S) : Yozo Kami

It is certified that error appears in the above-identified patent and that said Letters Patent is hereby corrected as shown below:

On the cover page, under "[56] References Cited", further under "FOREIGN PATENT DOCUMENTS", after "2649885" change "7/1917" to --7/1977--.

Column 6, line 11 (claim 12, 8th line), change "brackets" to --bracket--;

line 13 (claim 13, 2nd line), change "claim 1" to --claim 11--;

line 17 (claim 14, 2nd line), change" claim 1" to --claim 11--;

line 55 (claim 20, 1st line), after "chassis" insert --for a--;

line 56 (claim 20, 2nd line), after "said" insert --fuel tank has pivot brackets fixed on said outer shell, said link arm base ends are pivotally mounted to said tank through the brackets, and said--.

Signed and Sealed this

Twenty-fifth Day of April, 2000

Attest:

Q. TODD DICKINSON

*Attesting Officer*            *Director of Patents and Trademarks*